UNITED STATES PATENT OFFICE.

WILLIAM GEORGE WHITE, OF ANERLEY, AND ROBERT ALFRED ALBERT WHITE, OF ROTHERHITHE, ENGLAND.

POLYCHROME PRINTING-BLOCK.

SPECIFICATION forming part of Letters Patent No. 683,161, dated September 24, 1901.

Application filed February 12, 1901. Serial No. 46,983. (No specimens.)

*To all whom it may concern:*

Be it known that we, WILLIAM GEORGE WHITE, engineer, residing at Thurlow House, Weighton road, Anerley, and ROBERT ALFRED ALBERT WHITE, engineer, residing at 14 Gomm road, Rotherhithe, in the county of Surrey, England, subjects of the King of Great Britain, have invented a certain new and useful Compound for Polychromatic Printing, of which the following is a specification.

This invention relates to the well-known polychromatic printing, in which solid blocks or sheets of composition containing the colors or dyes are employed. The composition we employ is made from stearic acid, thirty parts; pela, (vegetable wax,) twenty parts; pale boiled linseed-oil, fifteen parts; resin dissolved in spirits of turpentine, twenty-five parts; carbonate of soda as free as possible from water, ten parts. The resin it is preferred to employ is sandarac or mastic, which should be refined to deprive them of color. The stearic acid, pela wax, linseed-oil, and dissolved resin are mixed and well melted together. After partly cooling the carbonate of soda is then mixed and ground with above composition, which when solidified we call the "composition mass." The proportion of soda employed should be less than the saponification equivalent of the stearic acid. The use of stearic acid in place of mutton-fat and the like heretofore employed makes the printing-blocks harder and of a better consistency, and consequently enables a much larger number of impressions to be obtained from each block before it is consumed. We take thirty parts of the composition mass and twenty parts of well-washed fullers' earth, French chalk, or any other suitable absorbent and grind well together.

The different dyes or coloring-matter we use are as follows:

*Yellow.*—One hundred and twelve parts of galloflavine at twenty per cent., fifty-six parts of acetic acid, and four parts auramine. Mix and dry on glazed trays. Take seven parts of above, add three parts of dry acetate of chrome—chromium acetate $Cr_2(C_2H_3O_2)_6$—to one part of dye. So mixed, add two parts of composition mass and grind well together through granite roller-mills. After grinding melt and pass through fine-wire sieves.

*Alizarin-black.*—One hundred and twelve parts alizarin-black at twenty per cent., twenty-two parts acetic acid, and seven parts acetate of chrome. After drying take one part, mix with two and one-half parts composition mass, and grind well together.

*Green cerulein S powder,* (*Systematic Survey of the Organic Coloring Matters,* by Schultz and Julius, translated by Green, 1894 edition, page 160.)—To ten parts of green cerulein S powder add four parts of acetate of chrome. Take one part of this mixture and mix and grind with it two parts of composition mass.

*Alizarin-blue S powder,* (*Systematic Survey of the Organic Coloring Matters,* by Schultz and Julius, translated by Green, 1894 edition, page 128.)—To ten parts of alizarin-blue S powder add four parts of acetate of chrome. Take one part of this mixture and mix and grind with it two parts of composition mass.

*Alizarin indigo blue.*—To one and one-half pounds of alizarin indigo blue add seven and one-half ounces dry acetate of chrome. Mix and grind with four and one-half pounds of composition mass.

Alizarin or anthracene dyes of the following colors are treated as above in the same proportion.

*Alizarin-red, alizarin-orange, maroon, anthracene brown,* and *gallein,* (or *violet.*)— The cloths to be printed with above colors are mordanted with acetate of alumina at 10° Twaddell.

*Alizarin-yellow.*—Take alizarin-yellow, twenty-eight pounds at twenty per cent., add five pounds ten ounces acetic acid at 9° Twaddell, and eleven pounds four ounces of sulfocyanid of alumina. When dry, take eight pounds four ounces of the mixture and grind well and mix with sixteen pounds eight ounces of composition mass.

*Alizarin-black for wool and silk.*—Four parts of black, one part of oxalic acid, two parts of acetate of chrome, one and three-fourths parts of fullers' earth or other suitable absorbent, and one and one-fourth parts of acetate of iron. Dry and grind well together with fifteen and one-half parts of composition mass.

Anilin blue, green, yellow, &c., are used with the above dyes for printing on wool and silk in the same proportions.

The colors above mentioned form the standards from which all other shades are produced.

The color composition thus described we cut or form in the designs required, according to the lengths of the repeats. The blocks of color or type are made from two to six inches thick. The blocks of color are then cut into sheets of the required thickness.

What we claim is—

1. A color-printing composition resulting from the mixture of stearic acid, vegetable wax, linseed-oil, resin, alkali, the proportion of alkali being less than the saponification equivalent of the stearic acid, and coloring-matter, substantially as described.

2. A color-printing composition resulting from the mixture of stearic acid, vegetable wax, linseed-oil, resin, alkali, the proportion of alkali being less than the saponification equivalent of the stearic acid, acetate of chrome and coloring-matter, substantially as described.

3. A color-printing composition resulting from the mixture of stearic acid, vegetable wax, linseed-oil, resin, carbonate of soda, the proportion of soda being less than the saponification equivalent of the stearic acid, and coloring-matter in substantially the proportions specified.

4. A color-printing composition resulting from the mixture of stearic acid, vegetable wax, linseed-oil, resin, carbonate of soda, the proportion of soda being less than the saponification equivalent of the stearic acid, acetate of chrome, and coloring-matter in substantially the proportions specified.

WILLIAM GEORGE WHITE.
ROBERT ALFRED ALBERT WHITE.

Witnesses:
A. W. TUNBRIDGE,
E. MARESEAUX.